UNITED STATES PATENT OFFICE.

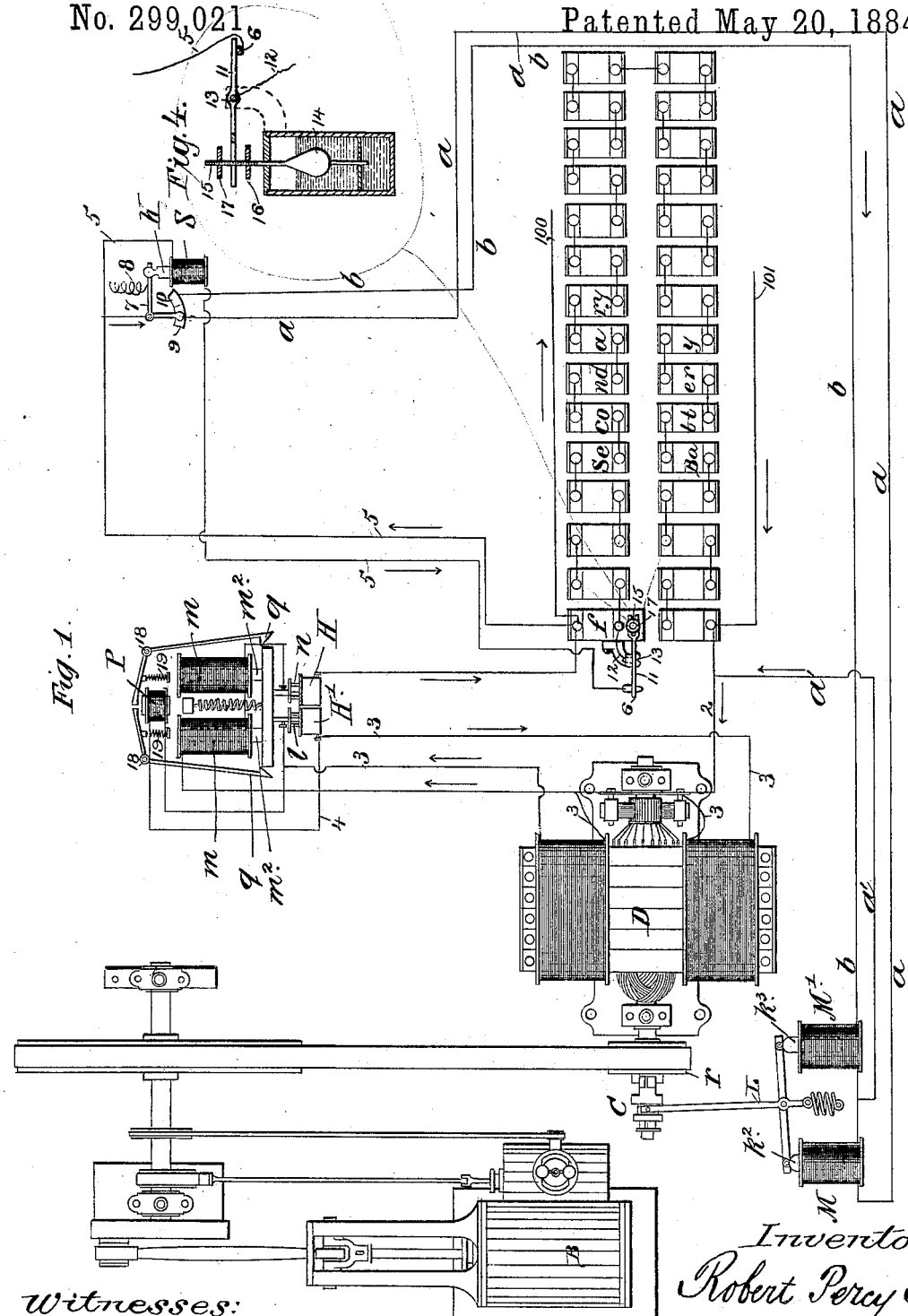

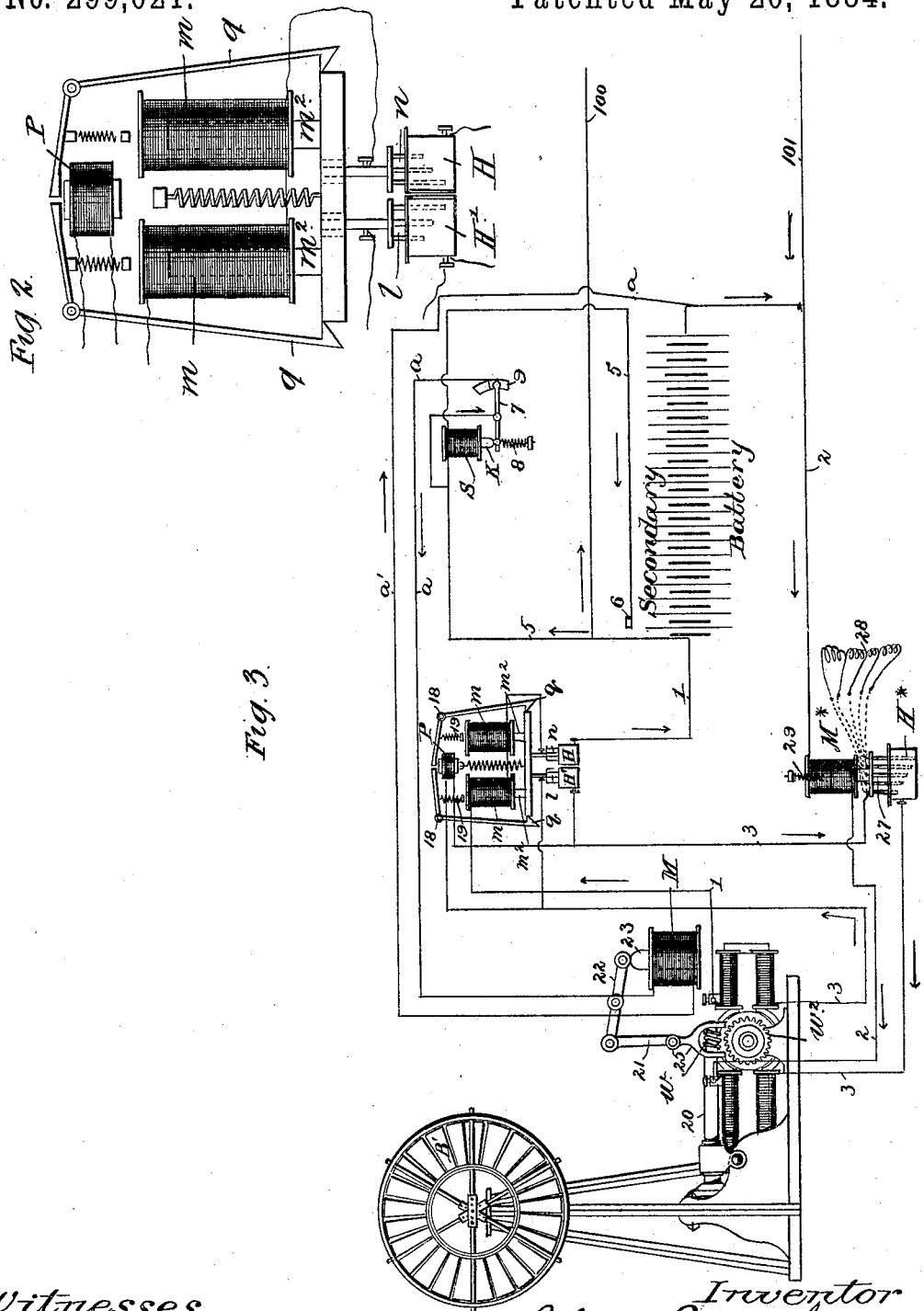

ROBERT PERCY SELLON, OF SURBITON, COUNTY OF SURREY, ENGLAND.

APPARATUS FOR CHARGING SECONDARY BATTERIES.

SPECIFICATION forming part of Letters Patent No. 299,021, dated May 20, 1884.

Application filed November 15, 1883. (No model.) Patented in England April 20, 1883, No. 2,023.

*To all whom it may concern:*

Be it known that I, ROBERT PERCY SELLON, electrical engineer, a subject of the Queen of Great Britain and Ireland, and residing at Surbiton, in the county of Surrey, England, have invented certain improvements in apparatus for supplying, maintaining, and regulating electrical force for battery-charging and other purposes, (for which I have obtained a patent in Great Britain, No. 2,023, dated April 20, 1883,) of which the following is a specification.

My invention relates to apparatus for supplying, maintaining, and regulating electric force for charging secondary batteries or accumulators, or for other purposes, and to devices for automatically causing a charging-current supplied by a dynamo or other means to energize such secondary batteries until such time as they are charged to the full or desired extent, and then automatically breaking or diminishing the said charging-current or throwing the generator or dynamo-machine out of the charging-circuit or causing it to cease from generating electricity, the charging-circuit remaining broken, or the generator remaining at rest or supplying no current to the batteries until such time as the electro-motive force or current of the secondary batteries drops or diminishes, owing to a withdrawal of a portion or all of the current supplied by the batteries for any purpose—such as lighting, heating, or the transmission of power—when the charging-circuit may be automatically re-established, either by means of an automatic switch or by means of an electro-magnet or magnets or other devices controlling mechanical devices for throwing the generator or other portion of the apparatus in and out of gear with the motive power supplied by any source, such as steam or gas engines or motors impelled by wind or water power; or I may in some cases employ both, either simultaneously or at different times.

My invention further relates to devices and apparatus for maintaining a constant or approximately constant electro-motive force or current at the poles of a dynamo, where the speed of the motor or dynamo varies to any extent, such as might be very apt to occur where wind-power is utilized for battery-charging or other electrical purposes.

The improved apparatus is illustrated in the accompanying drawings, in which Figures 1 and 3 are diagrams each of a battery-storage system, and Figs. 2 and 4 are enlarged detail views.

Referring to Fig. 1, D is the dynamo-electric machine, which is driven by a steam-engine, B, through a belt which runs on the pulley $r$. The pulley $r$ is not keyed to the shaft of the generating-armature, but is combined with clutch C, which turns with and slides upon the armature-shaft. Said clutch may be of any ordinary or suitable construction. When the clutch is pushed in, it engages the pulley $r$, and the generating-armature is revolved. When it is drawn out, as shown, the armature is thrown out of gear and the pulley $r$ runs free. This clutch C is moved in or out, by means of the electro-magnets M M', through the three-armed lever L. When the magnet M is excited, it attracts the core $k^2$ and moves the lever into the position shown, withdrawing the clutch C and throwing the dynamo out of gear with the prime motor or engine B. When the magnet M' is excited, it attracts its core $k^3$ and shifts the clutch into engagement, so that the armature of the dynamo is again revolved. The circuits of the magnets will be explained below.

The poles of the dynamo are connected by the wires 1 and 2 with the respective terminals of a secondary galvanic battery. The wires 100 and 101 of the consumption-circuit are connected with the same terminals. The wire 1 includes the coils of magnet $m$, and is completed through a contact-maker formed by the metal fingers $n$ and the mercury-trough H, into which said fingers dip.

The field-circuit 3 is derived from the main circuit. In it is placed a contact-maker, $l$ H', similar to that ($n$ H) in the main or charging circuit. There is also a loop, 4, of high resistance around the contact-maker $l$ H'. In this loop are included the coils of magnet P. The object of these contact-makers and magnets will be explained hereinafter. During the charging of the secondary battery the main and field circuits are closed through the mercury-cups. The wire 1 or a terminal of the battery is permanently connected through the wire 5, which includes the coils of magnet S, with the contact 6. The armature-core K is connected with a switch-lever, 7. A spiral tension-spring, 8, retracts the said lever when the magnetic attraction ceases. The end of the lever moves over two contact-plates, 9 and 10, which are insulated from each other, and are connected, respectively, with the branch or loop wires $a$ and $b$. The lever itself is permanently connected with the wire 5 at a point intermediate between the magnet S and the wire 1. The magnet M is included in the loop-wire $a$, the magnet M′ in the loop-wire $b$. A common wire, $a'$, establishes the connection of both wires with the wire 2. In the position shown the core K is attracted, the lever 7 makes contact with plate 9, and the circuit through magnet M is completed. This circuit is from wire 1, by way of wire 5, lever 7, plate 9, wire $a$, magnet M, and wire $a'$, to wire 2. The magnet M, being excited, draws in its core $k^2$ and shifts the lever L and clutch C, throwing the dynamo D out of gear. When, however, the core K is no longer held by the magnet S, the switch-lever 7 is turned by the retracting-spring 8, and by making contact with plate 10 cuts out the magnet M and connects in the magnet M′. The circuit of this latter magnet is from the wire 1 by way of the wire 5, lever 7, plate 10, wire $b$, magnet M′, wire $a'$, to wire 2. The magnet M′ now draws in its core $k^3$, and by shifting the lever L and clutch C to the right throws the dynamo again into gear. These movements of the core K and lever 7 are controlled by an automatic circuit-changer, which is actuated by the charge and discharge of the secondary battery, and which opens and closes the circuit of the magnet S.

The circuit-changer consists of a switch-lever, 11, which is permanently connected by the wire 12 with the negative terminal of the cell $f$ and of the contact 6, before referred to, which is supported (by means not shown) under the said lever. The lever 11 is pivoted at 13 to an insulated support, and is clamped by the pivot-screw with sufficient friction to prevent accidental motion. There is no retractile spring, so that the lever remains in whatever position it may be placed. In the end of the cell $f$ is a small chamber, in which is a float, 14. The stem 15 of this float extends through the lid of the containing-vessel, and carries two disks, 16 and 17, which are or may be adjustable. The stem 15 passes between the forked arms of lever 11, and the disks 16 and 17 are arranged, respectively, below and above the fork.

When the battery is charged, the electrolyte or exciting-liquid, which fills the float-chamber to a proper height, becomes denser. The float rises until finally the disk 16 strikes the lever 11, lifts the inner end, and causes the outer end to touch the contact 6. Immediately the magnet S is excited and draws in the core K, the lever 7 is turned into contact with plate 9, the circuit of the magnet M is established, the clutch C is shifted to the left, and the dynamo is thrown out of gear with the prime motor. The charging is therefore arrested. As the battery discharges, the exciting-liquid or electrolyte in cell $f$ becomes specifically lighter, the float sinks, and finally the disk 17 strikes and forces down the inner end of lever 11, moving the outer end away from the contact 6. The circuit of magnet S is thereby broken, the switch-lever 7 is turned by the spring 8, the circuit of magnet M′ is completed, the clutch C is moved to the right, and the dynamo D is again put into gear with the prime motor B. The charging of the secondary battery then commences again. If, while the dynamo was thrown out of gear, the charging-circuit should remain unbroken, the battery would discharge itself through the armature and the field. The strong current would very likely destroy the armature, and even if this did not take place there would still be a great loss of the stored energy. The difficulty is overcome by breaking the circuit at the mercury-cups H H′. As the armature of the dynamo, after being disconnected from the pulley $r$, lessens its speed, the electro-motive force of the battery becomes higher than that of the dynamo, and the discharge into the dynamo commences. As soon, however, as the current becomes strong, it excites the magnet $m$ sufficiently to cause it to draw in the cores $m^2$. This movement withdraws the fingers $l$ $n$ from the mercury-cups H′ H and establishes a break in the wires 1 and 3. The electro-motive force of the dynamo in charging is not enough higher than that of the secondary battery to create a current of sufficient strength to cause the breaking of the circuit. The fingers $l$ $n$ are carried by, but insulated from, the cross-piece (which may serve as an armature) at the ends of the cores $m^2$. When they are raised, spring-catches $q$ snap under the cross-piece and retain it in the raised position, leaving the circuit broken. The catches are pivoted at 18, and are forced into engagement with the cross-piece by the spiral compression-springs 19. This condition of things remains—the wires 1 and 3 broken at the mercury-cups and the dynamo out of gear—until the charge of the secondary battery is exhausted or is fallen to the desired point. This point can be regulated by adjusting the disk 17 on the stem 15. The dynamo is then again connected in gear and commences to generate electricity. The charging-circuit, however, remains broken until the dynamo has attained a suitable degree of electro-motive force. Until then the current is utilized in exciting the field, the circuit of which, although broken at the mercury-cup H′, is yet completed through the loop 4 of high resistance. As the electro-motive force of the dynamo rises the current increases until the magnet P is excited sufficiently to withdraw the catches $q$. The cores $m^2$, being released, fall and the fingers $l$ $n$ again make contact with the mercury in cups H H′. The circuits being now established, the charging of the secondary battery continues until the dynamo is again thrown out of gear by the rise of the float in the cell $f$.

In Fig. 3 substantially the same system is shown; but certain parts are modified, and an automatic governor is introduced to compensate for the irregularities in the movement of the prime motor, which in this case is a wind-wheel. This wheel B' is connected by gearing with a horizontal shaft, 20, which is so supported that the end which carries the worm $w$ can be raised or lowered without disengaging the driving-gear. When the worm is lowered, it engages the wheel $w^2$, through which it communicates motion to the armature of the dynamo. The outer end of shaft 20 is journaled in the fork 25, which is connected by the link 21 with the lever 22. To the opposite end of the lever the core 23 is fastened. When this core is attracted by the magnet M, the worm $w$ is lifted away from the wheel $w^2$ and the dynamo is thrown out of gear. The circuit of the magnet M is closed, as before, by the lever 7 making contact with the plate 9. When the circuit is broken by the spring 8 turning the lever 7, the worm $w$ drops by gravity into engagement with the wheel $w^2$ and the dynamo's armature is again put in motion.

The lever for making and breaking the circuit of the magnet S through the contact 6 and the float for operating the said lever by change in gravity of the liquid in cell $f$ are not shown. They are the same as before described with reference to Figs. 1 and 4.

The mechanism $m$ $m^2$, $q$ P, $l$ H', and $n$ H, for automatically breaking the circuit to prevent the discharge of the secondary battery, is as before described. The circuit-wires are lettered the same as in Fig. 1. In the wire 2 is placed an electro-magnet, which operates to vary the resistance in the field-circuit 3, so as to maintain constant the electro-motive force of the dynamo, notwithstanding the variations in the speed of the wind-wheel B'. The core carries a series of fingers, 27, of different lengths. They are of conducting material, and are held in a support of insulating material, or are insulated from the support. They are connected with each other through the resistance-coils 28. The shortest finger and the mercury-cup are connected with the ends of wire 3. Below the fingers is a mercury-cup, H*. The core is combined with a spring or springs, 29, which antagonize the attraction of the magnet M*. When, therefore, the charging-current diminishes, the spring or springs draw down the core and force one or more additional fingers 27 into the mercury. One or more of the resistance coils 28 are thus cut out by short-circuiting. The resistance of the field-circuit 3 is thus diminished, a larger current circulates in the coils of the field-magnet, and the electro-motive force of the dynamo is thus maintained. When the charging-current rises, the attraction of the magnet M* overcomes the force of the antagonistic spring or springs, raises the core and fingers, and connects in one or more of the resistance-coils 28. The current exciting the field is thus diminished and the electro-motive force is lowered. The instrument is simply an automatic regulator operated by the rise and fall of current on the main or charging circuit, to change inversely the excitation of the field. Such an instrument, broadly, is not new. It is claimed herein only in combination with other elements of the system.

It is evident that modifications could be made in details without departing from the spirit of the invention, and that parts of the invention could be used separately.

Having now fully described my said invention and the manner of carrying the same into effect, what I claim is—

1. The combination, with a prime motor, a dynamo, and a secondary battery, of mechanism for throwing the dynamo into or out of gear with the said motor, and appliances, such as explained, for automatically operating said mechanism as the secondary battery is charged or discharged, substantially as described.

2. The combination, with the dynamo having its field excited in a derived circuit, of a contact-maker in said circuit, mechanism for operating said contact-maker to break the circuit, and a magnet in a loop around said contact-maker for re-establishing the broken circuit when it becomes sufficiently energized or excited, substantially as described.

3. The combination, with the dynamo, the prime motor for driving the same, and the secondary battery to be charged by the dynamo, of the automatic mechanism, such as explained, for throwing the dynamo into and out of gear, and the automatic safety device, such as explained, for making and breaking the charging-circuit, substantially as described.

4. The combination, with a motor of variable speed, of the dynamo driven thereby, the storage or secondary battery, the mechanism, as explained, for automatically throwing the dynamo into and out of gear with said motor, and the automatic regulator for maintaining approximately constant the electro-motive force of said generator notwithstanding variations in the speed, substantially as described.

5. The combination, with the dynamo having its field excited in a derived circuit, of contact-makers in the main and field circuits, respectively, a magnet in the main circuit for operating said contact-makers to break the circuit, a loop derived from the field-circuit, a magnet in said loop, and connected devices for operating said contact-makers to close the circuit when said loop-magnet is sufficiently excited, substantially as described.

In testimony whereof I have signed my name to this specification in the presence of two subscribing witnesses.

ROBERT PERCY SELLON.

Witnesses:
 CHAS. JAS. JONES,
  47 *Lincoln's Inn Fields, London.*
 W. J. WEEKS,
  31 *Lombard Street, London.*